United States Patent [19]

Griffey

[11] 4,074,323
[45] Feb. 14, 1978

[54] TELEVISION RECEIVER PROTECTION SYSTEM

[75] Inventor: Donald E. Griffey, Skokie, Ill.

[73] Assignee: Matsushita Electric Industrial Co., Ltd., Franklin Park, Ill.

[21] Appl. No.: 677,074

[22] Filed: Apr. 14, 1976

[30] Foreign Application Priority Data

May 7, 1975 Japan .................................. 50-54980

[51] Int. Cl.² ............................................. H04N 5/68
[52] U.S. Cl. .................................... 358/243; 315/411
[58] Field of Search ........ 178/7.5 R, 7.3 R, DIG. 11; 315/411, 379, 409, 364; 317/31, 51; 361/91; 358/243

[56] References Cited

U.S. PATENT DOCUMENTS

| | | | |
|---|---|---|---|
| 3,576,946 | 5/1971 | Frizane | 178/7.3 R |
| 3,688,031 | 8/1972 | Fitzgerald et al. | 178/7.5 R |
| 3,692,932 | 9/1972 | Willmarth | 178/7.5 R |
| 3,715,464 | 2/1973 | Sendelweck | 178/7.5 R |
| 3,819,986 | 6/1974 | Fukuoka | 178/DIG. 11 |
| 3,885,201 | 5/1975 | Fernsler | 178/7.5 R |

*Primary Examiner*—John C. Martin
*Attorney, Agent, or Firm*—Drummond, Nelson & Ptak

[57] ABSTRACT

A television receiver protection system providing X-ray protection to the viewer responds to rectified horizontal flyback pulses supplied to the gate electrode of a silicon controlled rectifier through a zener diode to trigger the silicon controlled rectifier into conduction when the high voltage level from the flyback transformer of the receiver becomes abnormally high. The silicon controlled rectifier is connected across the power supply for the horizontal oscillator, so that the horizontal oscillator is rendered inoperative when the silicon controlled rectifier becomes conductive.

5 Claims, 1 Drawing Figure

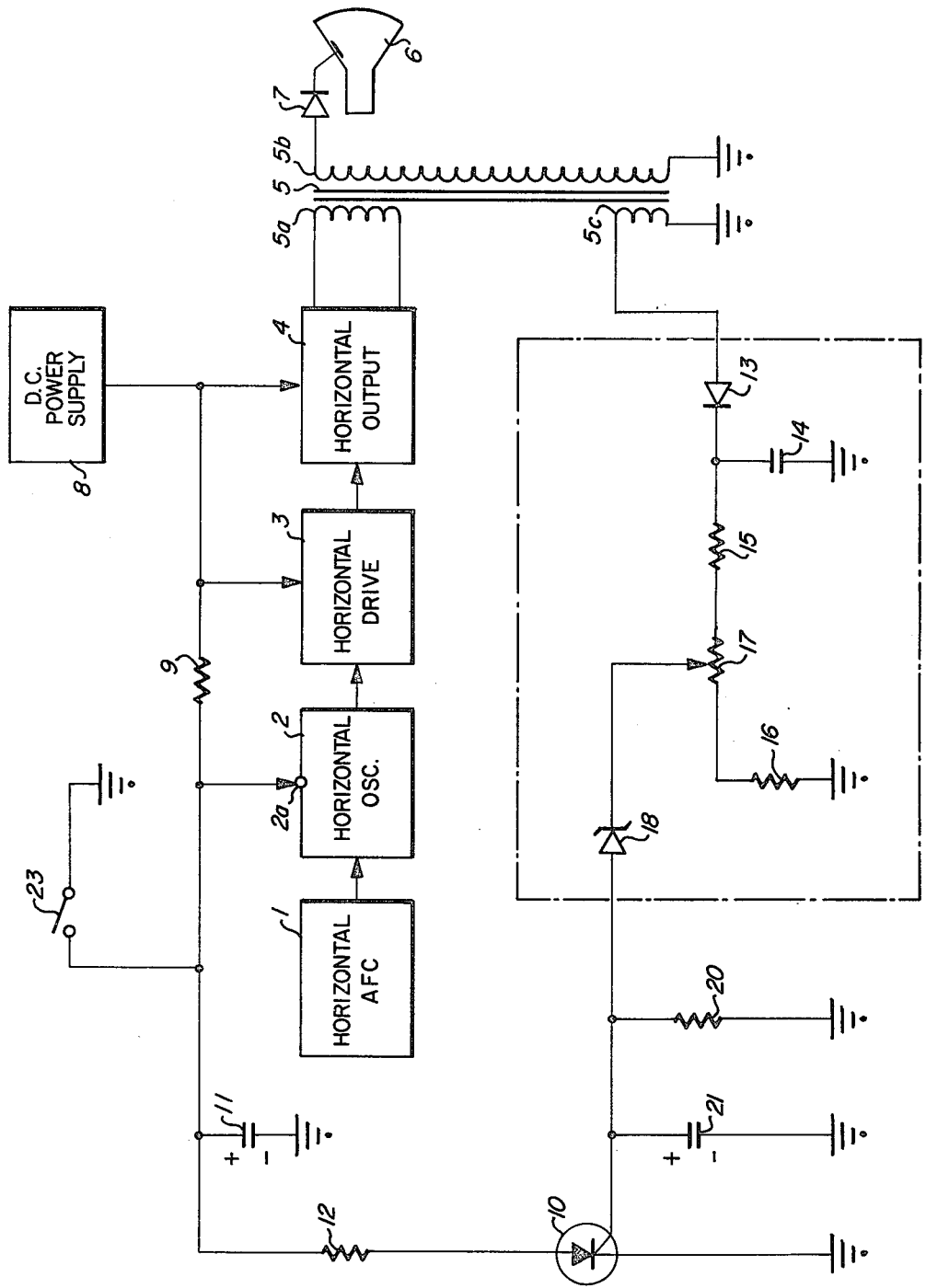

TELEVISION RECEIVER PROTECTION SYSTEM

BACKGROUND OF THE INVENTION

If the cathode ray tube of a television receiver is subjected to an abnormally high voltage, due to increases in the commercial power voltage or malfunctions of the horizontal output circuit elements, the cathode ray tube and adjacent circuits may be damaged or unnecessary X-ray radiation may occur from the cathode ray tube. Various types of protection systems for protecting the cathode ray tubes of television receivers from such excess high voltages have been designed. The protection systems available in the prior art, however, have been subject to one or more disadvantages and consequently have been found unsatisfactory.

A first type of prior art protection system operates in response to the rectified commercial power voltage; and when the commercial power voltage increases so that the rectified voltage exceeds some pre-established amount, a silicon controlled rectifier or thyristor is rendered conductive to turn off the entire DC voltage (B+ voltage) of the television receiver. This type of protection circuit, however, is not effective against problems other than an increase in the commercial power voltage and does not provide protection against defects in the horizontal circuits of the television receiver.

A second type of protection circuit which has been used in the past responds to the rectified horizontal transformer flyback pulses which are supplied to the cathode ray tube. In this type of system, the output signal of the horizontal drive circuit is shorted whenever the rectified high voltage exceeds a pre-established amount. This, then, prevents the high voltage from being applied to the cathode ray tube. In such a system, however, perfect protection for complete shutdown of the television receiver does not occur because the protecting action is continuously repeated. Once the protection has been effected, the protecting circuit ceases to operate until the high voltage again exceeds the pre-established amount. Such a circuit also requires expensive high voltage components.

A third type of prior art protection circuit which has been utilized employs a silicon controlled rectifier or thyristor connected across the input signal to the horizontal drive circuit. The silicon controlled rectifier or thyristor is activated to shunt the input signal to the horizontal drive circuit whenever the B+ voltage supplied to the horizontal output circuit exceeds a specific value. Once again, however, this type of protection circuit is not effective against troubles in the horizontal circuit components themselves.

A fourth system which has been employed for such protection is one in which the pulses appearing on the collector of the horizontal output transistor are rectified; and when the rectified voltage exceeds a specific amount, the horizontal oscillator frequency is changed so that the voltage applied to the cathode ray tube does not become higher than a specific amount. This type of protection circuit, however, also is not satisfactory because it continuously repeats the protecting action. That is, as soon as the voltage drops, the entire cycle continues to repeat.

Finally, in some of the conventional types of protection circuits which have been employed in the past, when the B+ power applied to the horizontal output circuit exceeds a specific amount, a silicon controlled rectifier or thyristor is rendered conductive to act as a load for the power rectification, cutting off the power fuse, thereby protecting the cathode ray tube from an abnormally high voltage. This type of circuit, however, is quite expensive, because silicon controlled rectifiers or thyristors capable of handling large power are required.

It is desirable to provide an inexpensive X-ray protection circuit for a television receiver which completely protects the cathode ray tube of the receiver from abnormally high voltages due either to increases in the power supply voltage or to defective operation of the horizontal stages of the receiver.

SUMMARY OF THE INVENTION

Accordingly, it is an object of this invention to protect the cathode ray tube of a television receiver from abnormally high voltages.

It is another object of this invention to provide an improved protection circuit for a television receiver.

It is an additional object of this invention to provide an improved X-ray protection circuit for a television receiver.

It is yet another object of this invention to render the horizontal oscillator of a television receiver inoperative when the high voltage applied to the cathode ray tube of the receiver exceeds a pre-established amount.

In accordance with the preferred embodiment of this invention, a protection system for a television receiver having a horizontal oscillator circuit and a horizontal flyback transformer is coupled across the DC power supply for the horizontal oscillator circuit. The protection circuit includes a voltage responsive switch in the form of a static latching switch having a control terminal coupled in circuit through a zener diode to a coil on the horizontal output transformer. When the output voltage from the horizontal output transformer exceeds a predetermined amount, the static latching switch is rendered conductive to shunt the power supply to the horizontal oscillator. This causes the horizontal oscillator to cease operation. A transient suppression circuit is coupled to the control terminal of the static latching switch to prevent false operation of the switch in response to transient signal phenomena.

BRIEF DESCRIPTION OF THE DRAWING

The single FIGURE of the drawing is a schematic diagram, partially in block form, of a preferred embodiment of the invention.

DETAILED DESCRIPTION

Referring now to the drawing, there is shown a television receiver protection system for use with a television receiver of conventional type. Those portions of a television receiver which are not necessary for an understanding of the present invention have not been shown, since such portions do not comprise a part of the present invention.

In the drawing, the conventional horizontal AFC or horizontal sync circuit 1 is shown connected to a horizontal oscillator 2 which supplies signals to a horizontal drive circuit 3, which in turn provides signals to the input of a horizontal output circuit 4. The output of the horizontal output circuit 4 is connected to the primary winding 5a of a horizontal flyback transformer 5. The high voltage secondary winding 5b of the transformer 5 is connected through a high voltage rectifier diode 7 to a cathode ray tube 6 of the television receiver for supplying high voltage to the cathode ray tube 6 in a conventional manner. A DC power supply 8 is shown connected to the oscillator 2, horizontal drive 3 and horizontal output stages 4. All of these parts are the same as employed in an ordinary television receiver and operate in a conventional manner.

The power supply 8 is specifically shown as connected to a power supply input terminal 2a for the horizontal oscillator circuit 2 through a resistor 9. In addition, the power supply input terminal 2a is connected through a resistor 12 to the anode of a static latching switch, such as a silicon controlled rectifier or thyristor 10, the cathode of which is connected to a point of ground potential.

The term "static latching switch" means any electronic switch which normally remains nonconductive and which is rendered conductive by applying a pulse or signal to a control terminal (gate) whereupon the switch "latches" to a conductive state so long as a minimum holding current flows through it. A transient by-pass capacitor 11 is connected between ground and the junction of the resistors 9 and 12.

An auxiliary winding 5c on the flyback transformer 5 supplies voltage regulated pulses (approximately 18 volts peak-to-peak) which are proportional to the high voltage pulses applied to the cathode ray tube 6 through the rectifier 7. The pulses from the winding 5c are rectified by a diode 13 and a filter capacitor 14 and supplied across a voltage divider consisting of three resistors 15, 16 and a variable resistor 17. The intermediate tap of the variable resistor 17 is connected through a zener diode 18 to the gate of the silicon controlled rectifier 10. Normally, no trigger signals are passed by the zener diode 18 to the gate of the silicon controlled rectifier 10.

When the voltage supplied to the cathode ray tube 6 from the flyback transformer 5, however, becomes abnormally high, the voltage obtained from the winding 5c and applied to the zener diode 18 exceeds the threshold voltage of the zener diode 18 to cause it to conduct to apply a trigger pulse to the gate of the silicon controlled rectifier 10, rendering the silicon controlled rectifier conductive. The resistors 15, 16 and the variable resistor 17 are intially set so that the silicon controlled rectifier 10 is rendered non-conductive so long as the voltage applied to the cathode ray tube 6 is in the range of normal operation of the television receiver. The zener diode 18 is rendered conductive when the voltage at the intermediate tap of the variable resistor 17 exceeds the total value of the trigger voltage and the zener voltage or threshold breakdown voltage of the diode 18 as against ground or the chassis potential.

To prevent false triggering of the silicon controlled rectifier or thyristor 10, a resistor 20 and capacitor 21 are connected between the gate of the silicon controlled rectifier and ground. The time constant of the circuit comprising the resistor 20 and the capacitor 21 is selected so that the transient voltages, even in excess of the threshold breakdown voltage of the zener diode 18, do not trigger the silicon controlled rectifier 10.

Once the silicon controlled rectifier 10 has been rendered conductive, near ground potential is applied to the lower end of the resistor 12. This, in turn, reduces the voltage applied to the terminal 2a of the horizontal oscillator circuit 2 nearly down to the chassis ground potential level, thus stopping operation of the horizontal oscillator 2. Also, the output from the horizontal output circuit 4 is stopped to prevent the cathode ray tube 6 from receiving the abnormally high voltage which precipitated operation of the protection circuit. As is well known, the silicon controlled rectifier 10 continues to conduct after it intially has been rendered conductive until the current path through it is interrupted.

After repair of the defective parts which caused the excess voltage, for example, the system is reset by momentarily reclosing the reset switch 23 to apply ground potential to the terminal 22. This causes the silicon controlled rectifier to cease conduction and return to its original non-conductive state. Thus, once the silicon controlled rectifier 10 has been rendered conductive due to an abnormally high voltage, the circuit operation of the television receiver is stopped until operation of the reset switch 23, after elimination of the trouble. This avoids continuous repetition or recycling of the protection action to insure perfect protection.

As described above, prior conventional systems required high voltage and high power transistors and silicon controlled rectifiers to effect the protection circuit operation. The circuit shown in the drawing, however, uses low voltage pulses from the winding 5c to control the power supply of the horizontal oscillator circuit. Therefore, low voltage parts are used, and the generation of an abnormally high voltage applied to the cathode ray tube 6 can be prevented because the system is designed to stop the operation of the horizontal oscillator 2. In addition, because of the silicon controlled rectifier 10, once the system has been activated, no high voltage is generated unless the reset switch 23 is operated after repair of the defective parts, or after the power supply switch once turned off is turned on. This insures perfect protection without the repetition phenomena of the protecting action. In addition, the system is relatively inexpensive because the component parts are simple, readily available low voltage parts.

I claim:

1. A protection system for a television receiver having a horizontal oscillator circuit, a horizontal flyback transformer, and a direct current power supply input terminal coupled with the horizontal oscillator circuit, said protection circuit including in combination:
   static latching switch means having a control terminal and coupled between the power supply input terminal and a point of reference potential;
   transient suppression circuit means coupled with the control terminal of said static latching switch means; and coupling circuit means including a voltage threshold sensing means direct current coupled between the flyback transformer and the control terminal means of said static latching switch means for rendering said switch means conductive in response to voltages from the flyback transformer which produce voltages in excess of the threshold voltage of said voltage threshold sensing means to terminate operation of the horizontal oscillator circuit by reducing the direct current power applied thereto.

2. The combination according to claim 1 wherein said latching switch means comprises a static latching switch having first, second and third terminals, with the first terminal thereof coupled with the power supply input terminal, the second terminal thereof coupled with the point of reference potential, and the third terminal thereof comprising said control terminal.

3. The combination according to claim 2 wherein said transient suppression circuit means comprises a resistor and capacitor connected in parallel with one another between the second and third terminals of said static latching switch.

4. The combination according to claim 3 further including a rectifier and a voltage divider, said voltage divider coupled through said rectifier between the flyback transformer and the point of reference potential, and wherein said voltage threshold sensing means comprises a zener diode connected between a tap on said voltage divider and the third terminal of said static latching switch.

5. The combination according to claim 4 wherein said static latching switch comprises a silicon controlled rectifier, and wherein the first terminal thereof comprises the anode, the second terminal thereof comprises the cathode, and the third terminal thereof comprises the gate.

* * * * *